(12) United States Patent
Kurtz et al.

(10) Patent No.: US 8,975,898 B2
(45) Date of Patent: *Mar. 10, 2015

(54) SHUNT CALIBRATION FOR ELECTRONIC PRESSURE SWITCHES

(75) Inventors: Anthony D. Kurtz, Saddle River, NJ (US); Nora Kurtz, legal representative, Saddle River, NJ (US); Wolf Landmann, Fair Lawn, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 851 days.

This patent is subject to a terminal disclaimer.

(21) Appl. No.: 13/031,549

(22) Filed: Feb. 21, 2011

(65) Prior Publication Data

US 2011/0169497 A1 Jul. 14, 2011

Related U.S. Application Data

(63) Continuation-in-part of application No. 11/341,398, filed on Jan. 26, 2006, now abandoned, which is a continuation of application No. 10/677,986, filed on Oct. 2, 2003, now Pat. No. 7,073,389.

(51) Int. Cl.
*G01R 31/08* (2006.01)

(52) U.S. Cl.
USPC ..................... 324/526; 324/750.02

(58) Field of Classification Search
USPC .......................................... 324/526
See application file for complete search history.

(56) References Cited

U.S. PATENT DOCUMENTS

| | | | |
|---|---|---|---|
| 3,057,419 A * | 10/1962 | Spademan | 177/12 |
| 3,702,076 A | 11/1972 | Georgi | |
| 4,023,066 A | 5/1977 | Smulders | |
| 4,138,709 A | 2/1979 | Colwill | |
| 4,233,848 A | 11/1980 | Sato et al. | |
| 4,419,620 A * | 12/1983 | Kurtz et al. | 323/280 |
| 4,667,516 A | 5/1987 | Schulz | |
| 4,966,034 A | 10/1990 | Bock et al. | |
| 5,085,287 A * | 2/1992 | Utsumi et al. | 180/179 |
| 5,253,532 A | 10/1993 | Kamens | |
| 5,451,881 A * | 9/1995 | Finger | 324/433 |
| 5,614,678 A | 3/1997 | Kurtz et al. | 73/727 |
| 5,686,826 A | 11/1997 | Kurtz et al. | 323/365 |
| 6,288,638 B1 * | 9/2001 | Tanguay et al. | 340/514 |
| 6,433,554 B1 * | 8/2002 | Kawate et al. | 324/500 |
| 6,529,847 B2 | 3/2003 | Hamilton et al. | |
| 6,640,644 B1 | 11/2003 | Mireles et al. | |
| 7,073,389 B2 * | 7/2006 | Kurtz et al. | 73/727 |
| 2005/0072244 A1 * | 4/2005 | Kurtz et al. | 73/727 |

* cited by examiner

*Primary Examiner* — Thomas F Valone
(74) *Attorney, Agent, or Firm* — Troutman Sanders LLP; James E. Schutz; Mark Lehi Jones

(57) ABSTRACT

Disclosed herein is an electronic switch that comprises a pressure sensitive bridge array adapted to monitor pressure and activate an indicator when the monitored pressure exceeds a predetermined value indicative of a dangerous condition. The electronic switch further comprises a monitoring circuit adapted to test the overall operability of the pressure sensitive bridge array and its accompanying electronics control circuitry.

19 Claims, 5 Drawing Sheets

SHUNT CALIBRATION FOR ELECTRONIC PRESSURE SWITCHES

CROSS-REFERENCE TO RELATED APPLICATIONS

This application is a continuation-in-part application claiming priority under 35 U.S.C. §120 to U.S. patent application Ser. No. 11/341,398, entitled "SHUNT CALIBRATION FOR ELECTRONIC PRESSURE SWITCHES," filed 26 Jan. 2006, which is a continuation application claiming priority to U.S. patent application Ser. No. 10/677,986, entitled "SHUNT CALIBRATION FOR ELECTRONIC PRESSURE SWITCHES," filed 2 Oct. 2003, now U.S. Pat. No. 7,073,389, both of which are hereby incorporated by reference in their entirety as if fully set forth below.

FIELD OF INVENTION

This invention relates to electronic pressure switches and, more particularly, to an electronic pressure switch employing a piezoresistive bridge array and a means for checking the overall operability of the switch.

BACKGROUND OF THE INVENTION

As one can ascertain, a pressure switch is a device that closes or opens an electrical contact when the pressure is above or below a certain preset threshold. By connecting this switch to a lamp, or other indicator, the operator can immediately discern, in a coarse way, if the pressure or normal or not. Other typical uses of such switches are driving the coil of a relay, driving a logical input circuit and so on. Such pressure switches are utilized in many environments, such as in automobiles, airplanes, and for other purposes where a pressure indication is a desirable feature to monitor.

Although the information provided by a pressure switch does not have the accuracy of the pressure transducer, these switches accomplish an important reliability function. Very often, they are used in parallel with the transducer to provide valuable backup information in case of transducer or indicator failure. Such use is very common, for example, in aircraft systems, where the correct pressure is critical and the wrong pressure can cause an immediate flight abort in order to avoid a crash.

As indicated, the pressure switch gives an indication that a monitored pressure has exceeded a predetermined value, but does not really indicate what the pressure is. Assuming that the reading of the pressure indicator in a flight critical system shows zero pressure, by observing the status of the lamp connected to the switch and the indication of the other instrumentation in the system, the pilot can safely conclude that the pressure is probably correct, but either the transducer, the indicator, or the wiring failed. Conversely, if the lamp activated by the switch indicates a wrong pressure, the operator can look at the transducer indication and determine if the pressure is correct or not.

Numerous switches are simple electromechanical devices. Typically, they comprise a Bourdon tube connected to the pressure source, which activates a snap action microswitch. Although simple and relatively inexpensive, these mechanical switches have serious shortcomings. Some of the shortcomings are: poor accuracy of the trip point, poor control of the hysteresis, poor stability versus temperature, poor stability in time and otherwise, poor reliability, i.e. contact failures open or close. Due to these weaknesses, the mechanical switches are being replaced by electronic solid state devices. They are made using a piezoresistive bridge to sense the pressure, an electronic circuit to amplify the output of the sensor and a comparator with a pre-set threshold which drives a bipolar transistor or MOSFET, which is the actual switching element.

The characteristics of the electronic switches are significantly better than the mechanical counterparts. Especially important is their reliability and stability whereby many systems use only such switches instead of transducers. One feature missing from these electronic or mechanical switches is the ability to check if they are working or not before the pressure is turned on. Thus, as one can determine, before a flight, one must really determine whether or not the pressure switch is operating correctly. This is especially true in regard to aircraft operation, as wrong pressures can be extremely critical and cause accidents and fatalities.

It is therefore, an object of the present invention to provide an apparatus to determine whether a pressure switch is operating before a flight commences, in the case of an aircraft.

It is a general object of the present invention to check a pressure switch utilizing a shunt calibration technique to determine whether or not the pressure switch is operating properly.

SUMMARY OF INVENTION

Exemplary embodiments of the present invention provide an electronic switch that comprises a resistive bridge for providing a voltage indicative of a pressure applied thereto and an electronics control circuit electrically coupled to the resistive network. The electronics control circuit is adapted to receive the voltage indicative of the applied pressure and provides an indication when the received voltage exceeds a predetermined value indicative of an alarm condition. Embodiments may further comprise a switch that selectively shunts impedance into the resistive bridge to bias the voltage indicative of the applied pressure, which in turn causes the electronics control circuit to provide an indication of an alarm condition without application of a pressure corresponding to a voltage exceeding the predetermined value. Embodiments may also comprise a monitoring circuit in electrical communication with the resistive bridge and the electronics control circuit and adapted to provide a signal indicative of the operability of the resistive network and control circuit.

DETAILED DESCRIPTION

Figure 1:
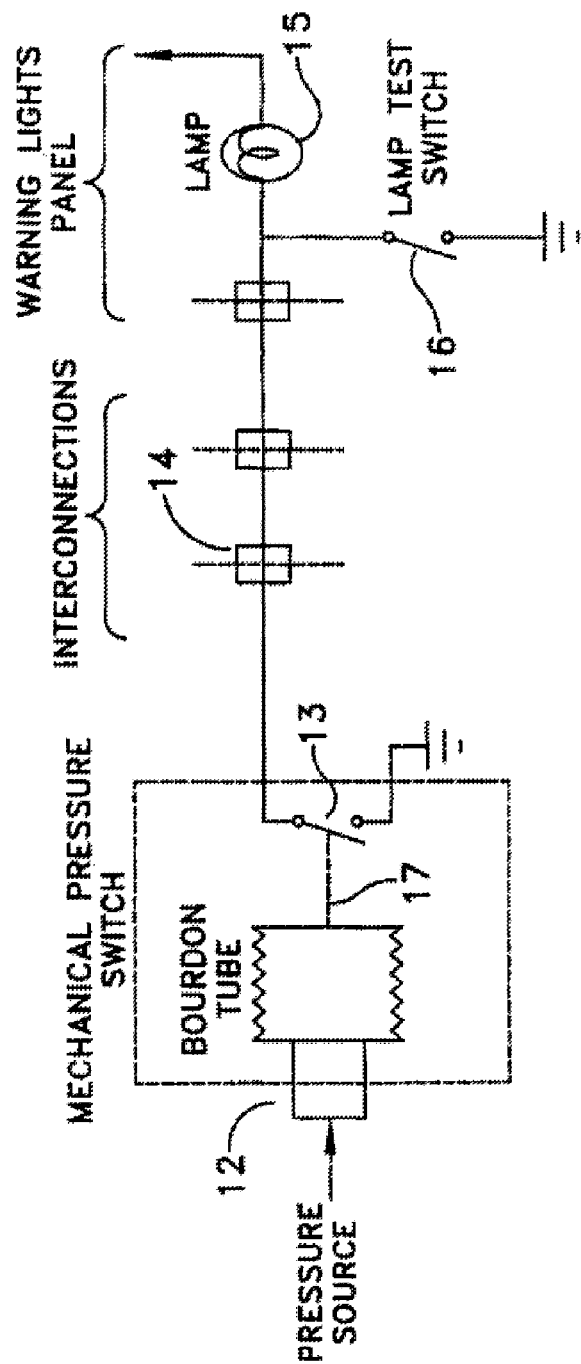
FIG. 1 is a schematic diagram of a prior art mechanical switch useful in explaining the operation of this invention.

Referring to FIG. 1, there is shown a typical prior art mechanical switch. Essentially, as one can see, a pressure source is applied to the pressure port of a Bourdon tube mechanical pressure switch 12. Bourdon tubes and Bourdon mechanical switches are well known in the art. A Bourdon type pressure gage is a widely used instrument in which pressure measurement is based on the deformation of an elastic measuring element. This element may be a curved tube, and its deformation is indicated by a pointer and a dial, which is calibrated to give pressure measurements.

The Bourdon tube has a coupling member 17 which is coupled to the actuator of a microswitch 13. Microswitches are well known. The microswitch 13 has one terminal connected to ground and the other terminal connected to an input terminal of a lamp 15, which receives a biasing voltage at the other end. As one can understand, as soon as the member 17 operates to close the microswitch, the lamp is lit, indicating that there is an excessive pressure or a deficiency of pressure, without specifying the magnitude of the pressure. The terminal 14 can be coupled to another switch, relay or device to inactivate or control the monitored pressure source.

In FIG. 1, the prior art problem is also noted. As one can see, the lamp test switch 16, when closed to operate enables the lamp 15 to energize. If the lamp comes on, then one indicates that the lamp is functioning, but there is no indication whatsoever that the pressure switch is functioning, or that the switch 13 is functioning. Thus, as one can see from FIG. 1, the mechanical switch circuit depicted does not provide the ability to check operation before the pressure is turned on, as before a flight. The only thing that the operator or pilot can determine is that the lamp 15 is operable and he has no knowledge as to whether the switch is functioning accurately. It is, of course, understood that apart from the Bourdon type pressure gages, there are many other pressure gages which are utilized in the prior art, as mechanical type devices.

Figure 2:
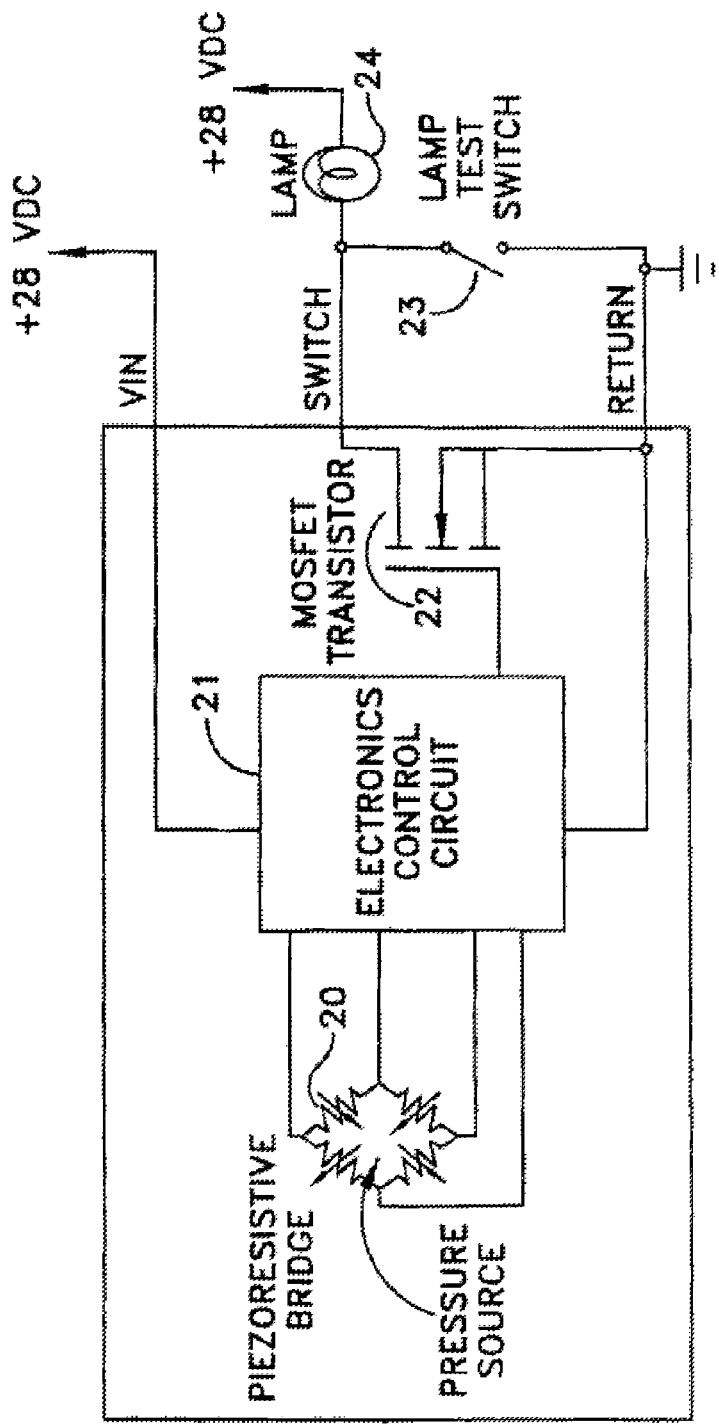
FIG. 2 is a schematic diagram of a prior art electronic switch utilizing a piezoresistive bridge useful in explaining the operation of this invention.

Referring to FIG. 2, there is shown a prior art electronic switch. As one can ascertain from FIG. 2, the electronic switch, as indicated, utilizes a piezoresistive bridge 20. Piezoresistive transducers are well known in the art and the assignee herein is one of the leading manufacturers of these transducers. Basically, a piezoresistor transducer utilizes a piezoresistive bridge in a Wheatstone Bridge configuration. The piezoresistive devices respond directly to an applied pressure to vary their resistance accordingly. Hence, the output voltage of the bridge changes according to the applied pressure. In this manner, an electronic control circuit 21 monitors the output of the bridge and, for example, apply the amplified output of the bridge to a comparator circuit. One input of the comparator is responsive to the output of the bridge, while the other input of the comparator is coupled to a predetermined reference potential indicative of a pressure which, if exceeded, would create a hazardous condition. This signal enables an output lead of the control circuit 21, which is connected to the gate electrode of a MOSFET transistor 22 to receive a signal which would switch the MOSFET on and hence, cause lamp 24 to illuminate indicative of this detected pressure condition.

As one can see, the prior art also utilizes a lamp test switch 23, which again, functions as switch 16 of FIG. 1. One can also ascertain from FIG. 2, that in the event of a failure of the Wheatstone Bridge 20, or in the event of the failure of the electronics control circuit 21, there would be no indication available. Hence, when the lamp test switch 23 is energized, the lamp would light if the filament of the lamp was intact. If the lamp was defective, the lamp would not illuminate and therefore, the operator would be notified that there is something wrong with the lamp. The circuit of FIG. 2 would not give any indication to the operator if there was anything wrong with the circuit in general. Therefore, as indicated above, the feature missing from electronic or mechanical switches is the ability to check if they are working or not before the pressure is turned on, as during an actual flight.

Figure 3:
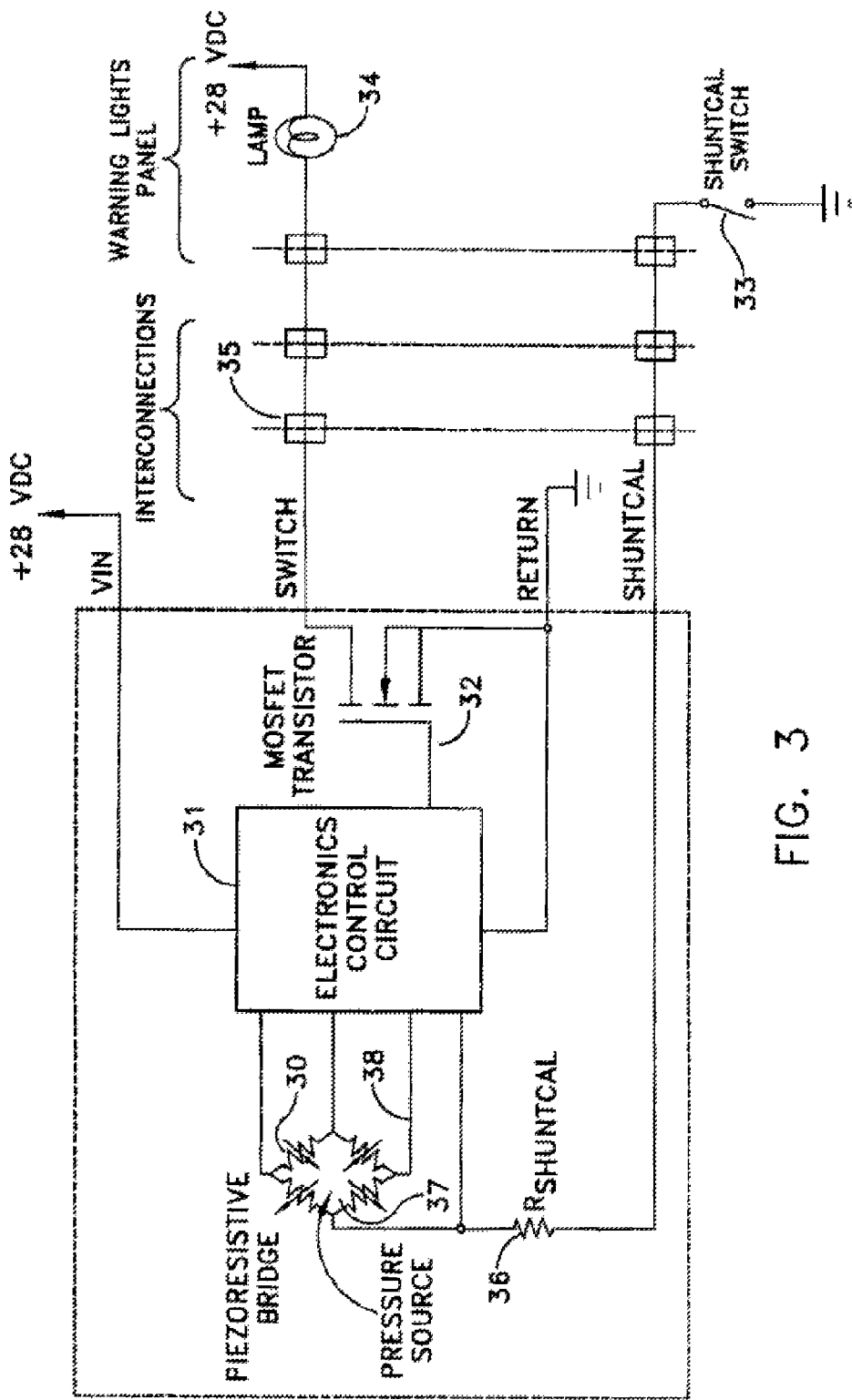
FIG. 3 is a schematic diagram showing a pressure switch with shunt calibration according to this invention.

Referring to FIG. 3, there is shown a circuit which utilizes an electronic switch (as that of FIG. 2), whereby the circuit makes a further determination that the switch is operating and that a critical pressure can be detected. Essentially, as seen from FIG. 3, the circuit configuration is consistent with that shown in FIG. 2. For example, the bridge 30 of FIG. 3 is a piezoresistive Wheatstone Bridge, as is the bridge 20. It receives a pressure from a pressure source, which a pressure source is applied to an input port of the pressure transducer, wherein it impinges upon a diaphragm containing the piezoresistor bridge.

As indicated, such circuit configurations are very well known. For example, see U.S. Pat. No. 5,686,826 entitled, "Ambient Temperature Compensation for Semiconductor Transducer Structures" by A. D. Kurtz and Wolf S. Landmann, the inventors herein, and assigned to Kulite Semiconductor Products, Inc. The patent issued on Nov. 11, 1997. See also U.S. Pat. No. 5,614,678 entitled, "High Pressure Piezoresistive Transducer" issued on Mar. 25, 1997. That patent describes a high pressure piezoresistive transducer, plus it cites many other patents which are assigned to Kulite Semiconductor Products, Inc. and which are indicative of the operation and use of piezoresistive sensors.

As seen in FIG. 3, and as in FIG. 2, the output of the bridge 30 is connected to inputs of electronic control circuit 31, which again is a comparator which compares the voltage generated by the bridge with a predetermined voltage to activate the MOSFET transistor 32 by applying a proper signal to the gate. The transistor 32 acts as a switch and hence, will illuminate light 34 if the output of the comparator is activated indicating that a monitored pressure has been exceeded. Thus, as one can readily ascertain, the circuits of FIG. 2 and FIG. 3 are relatively similar with the following addition. Shown in FIG. 3, there is a resistor 36 having one terminal connected to the piezoresistive bridge and the other terminal directed toward reference potential through a shunt calibration switch 33. The circuit operates as follows. For purposes of this example and to indicate the function of the shunt calibration resistor 36 and switch 33, the example describes the case of a pressure switch intended to indicate if the pressure in a fuel supply line is above or below 30 psia. When the pressure is below 30 psia, the switch indicative of MOSFET 32 is open. Any pressure above 30 psia closes the switch because MOSFET 32 will be activated by control circuit 31.

During normal operation, as one can ascertain, resistor 36 does not interfere with the operation of the bridge. When switch 33 is closed, resistor 36 is corrected in parallel with one of the arms of the bridge, for example, bridge resistor 37. The lower junctions of the bridge, indicated by reference numeral 38, is at reference potential and hence, resistor 36 can be used to shunt resistor 37 or any other resistor in the bridge. This produces an additional imbalance of the bridge 30. The value of resistor 36 is chosen such that the imbalance is equivalent to an additional pressure of about 30 psia. The switch 33 can be a conventional mechanical switch or an electronic switch, as one can easily ascertain. The electronic switch can now be tested as follows. When the aircraft is on the ground, with the fuel pump not yet activated, the pressure is normal atmospheric pressure 14.7 psia. Under these conditions, the switch must be open. By shorting or closing the switch 33, the switch will behave as if connected to a pressure source of 14.7 psia, plus 30 psia (44.7 psia). Now the switch must be closed. Both states of the switch, open and closed, can easily be observed by the operator without activating the pressure source. This test will verify that the bridge and entire electronic circuit operate properly.

This shunt calibration feature accomplishes another function besides checking the functionality of the switch 33. It also checks if the indicator lamp 34 is burned out, or if the wiring is damaged. If switch 33 is closed, then all connections from the piezoresistive bridge 30 to the lamp must be operating. As indicated, the prior art had lamp test switches 16 and 23, FIGS. 1 and 2, which turns all the lamps on. Based on that test, the pilot can conclude that the lamps are working. Unfortunately, the prior art traditional test will give a false sense of the integrity of the entire system. Therefore, as one can ascertain, if there is a system failure in the prior art, the lamp will still go on when the test switch is activated. In FIG. 3 this will not occur, as if the bridge is not operating and one shunts an inoperative bridge, then the correct signal will not be sent to the switch transistor 32 and the lamp 34 will not illuminate, indicating that there could be a failure in the bridge, the switch 32 or in the electronic control circuit 31. Also shown at the output of FIG. 3 are interconnections 35, which take the output from the MOSFET transistor 32, which goes to ground when the transistor comes on and uses such contacts to enable or disable other units associated with the pressure being monitored. For example, terminal 35 can be coupled to a relay or other devices which can sound an alarm if the desired pressure is exceeded.

Thus, as seen above, using the shunt calibration feature described in FIG. 3, the integrity of the entire system is verified prior to the flight. This includes the switch, the wiring, the connectors and the lamp.

Other exemplary embodiments may be designed to further confirm adequate operation of the bridge 30 and the electronic control circuit 31. An example of this embodiment is illustrated in FIG. 4.

Figure 4:
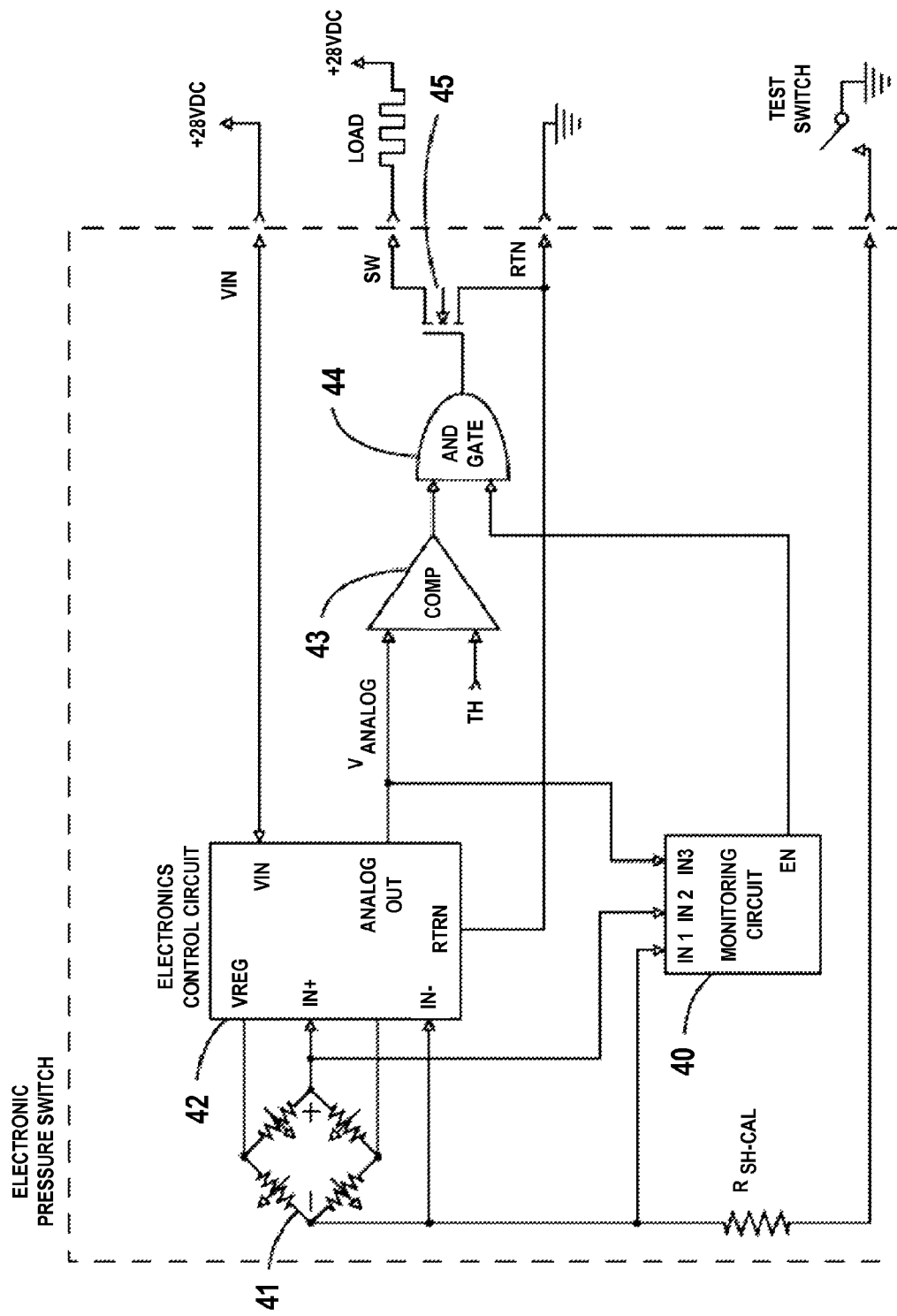
FIG. 4 is a schematic diagram showing a pressure switch with shunt calibration and a monitoring circuit in accordance with exemplary embodiments of the present invention.

Referring to FIG. 4, there is shown a monitoring circuit 40 that may be incorporated into the circuitry of the above-referenced embodiments. The monitoring circuit 40 may be adapted to perform tests that determine whether the piezoresistive pressure sensor bridge 41 and the electronic control circuit (also known as an "electronic interface") 42 are operating properly.

Figure 5:
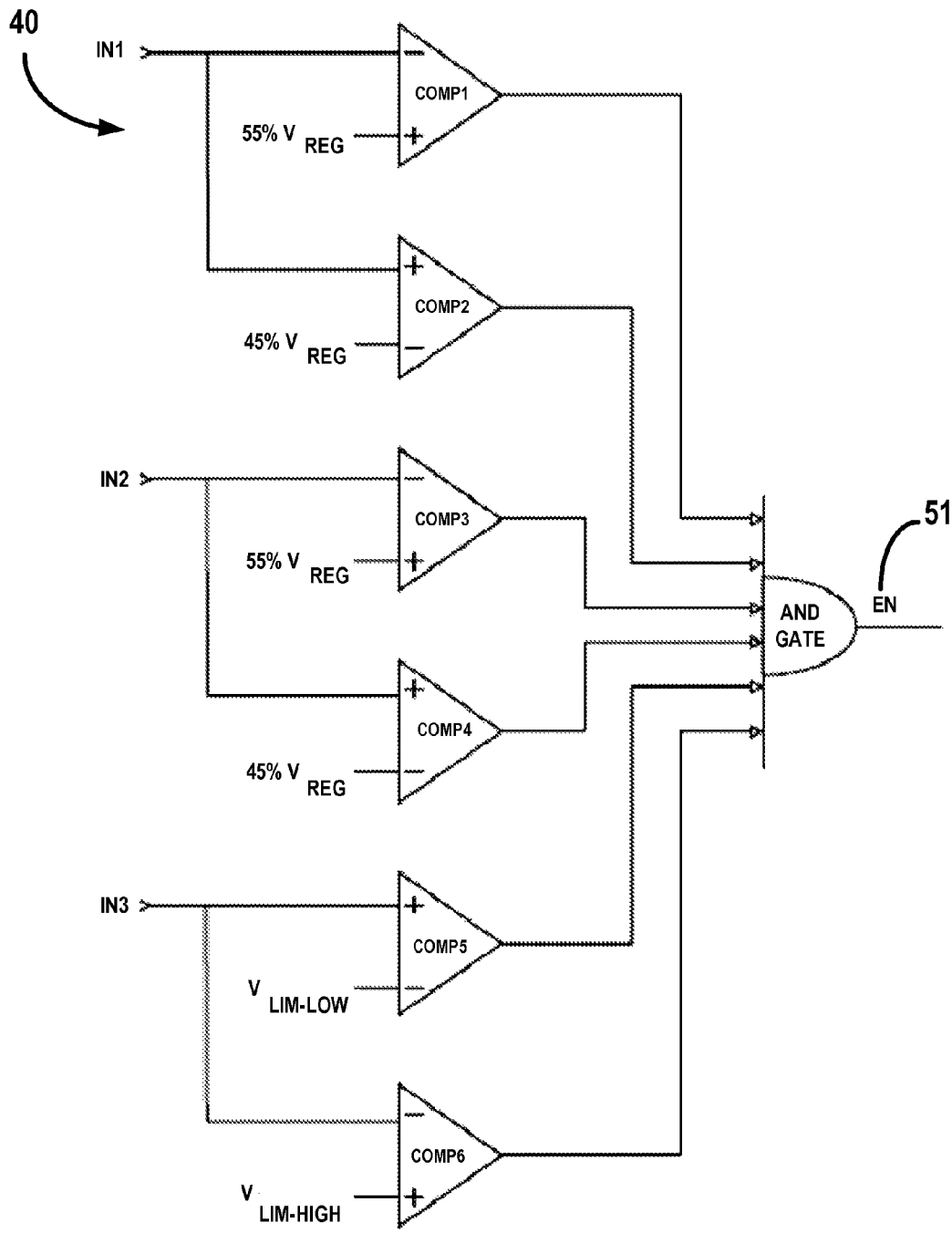
FIG. 5 is a schematic diagram showing the monitoring circuit in accordance with exemplary embodiments of the present invention.

The monitoring circuit 40 tests the integrity of the bridge 41 by comparing the output voltages from the bridge 41 relative to ground. Referring to FIG. 5, the monitoring circuit 40 comprises a plurality of comparators adapted to receive the output voltages from the bridge 41 and determine whether the two output voltages from the bridge 41 are within a desired range of the total bridge supply. Accordingly, if either output voltage is outside the bounds of the desired range, then the integrity of the bridge 41 has been compromised in some way. In exemplary embodiments, the two output voltages from the bridge 41 should be approximately 50% of the total bridge supply. In such an embodiment the comparators can be adapted to receive the output voltages from the bridge 41 and determine whether the two output voltages from the bridge 41 are within a 50±5% range of the total bridge supply. If any of the output voltages are too high (i.e., greater than 55% of the total bridge supply) or too low (i.e., less than 45% of the total bridge supply), then the integrity of the bridge 41 has been compromised in some way. Those skilled in the art will appreciate that a cracked sensor or a short in one or more arms of the bridges are primary causes of bridge failure, and thus cause the bridge to output voltages well below or above 50% of the bridge supply.

The monitoring circuit 40 may also test the integrity of the electronic control circuit 42 by determining whether the ANALOG OUT voltage is within a normal, predetermined operating pressure range. The monitoring circuit 40 can comprise another set of comparators that are adapted to receive the ANALOG OUT voltage and determine whether the ANALOG OUT voltage is too high or too low, which provides an indication that the electronic control circuit 42 has been compromised in some way.

If the monitoring circuit 40 determines that the output voltages from the bridge 41 and the ANALOG OUT voltage from the electronic control circuit 42 are within a desired range, it communicates a signal to the ENABLE output 51, which subsequently communicates an enabling signal to the AND gate 44 to pass the COMPARATOR signal 43 through to the MOSFET switch 45. Contrastingly, if the monitoring circuit 40 determines that the output voltages from the bridge 41 and/or the ANALOG OUT voltage from the electronic control circuit 42 are not within a desired range, it communicates a signal to the ENABLE output 51, which subsequently communicates a disabling signal to the AND gate 44 to prevent the COMPARATOR signal 43 from passing to the MOSFET switch 45. Consequently, an operator will only receive a positive indication from the MOSFET switch 45 only when both the bridge 41 and electronic control circuit 42 are operating properly.

The invention claimed is:

1. An electronic switch system, comprising:
a pressure-sensing resistive bridge adapted to provide an output indicative of a sensed pressure condition;
an electronics control circuit in electrical communication with the resistive bridge and adapted to provide a signal when the sensed pressure condition satisfies a threshold condition;
a switch for selectively shunting an electrical impedance into the bridge to ground, said impedance being of a magnitude to cause the bridge output to be indicative of a presence of a sensed pressure condition satisfying the threshold condition indicating operability of the resistive bridge and the electronics control circuit, without application of the sensed pressure condition to the resistive bridge; and
a monitoring circuit in electrical communication with and adapted to test the operability of the resistive bridge and the electronics control circuit.

2. The system of claim 1, wherein the electrical impedance is of a magnitude to cause a resistive bridge output indicative of a sensed pressure condition of at least a sum of the threshold condition and atmospheric pressure.

3. The system of claim 1, wherein the resistive bridge has at least one voltage output in electrical communication with the monitoring circuit.

4. The system of claim 3, wherein the monitoring circuit comprises a plurality of comparators adapted to determine whether the voltage output is within a desired voltage range.

5. The system of claim 4, wherein the plurality of comparators are adapted to determine whether the voltage output is approximately 50% of a total voltage supplied to the resistive bridge.

6. The system of claim 4, wherein the monitoring circuit outputs a signal to indicate that the resistive bridge is not operating properly when the voltage output is not within the desired voltage range.

7. The system of claim 1, wherein the electronics control circuit has at least one analog output in electrical communication with the monitoring circuit.

8. The system of claim 7, wherein the monitoring circuit comprises a plurality of comparators adapted to determine whether the analog output is within a desired voltage range.

9. The system of claim 8, wherein the monitoring circuit outputs a signal to indicate that the electronics control circuit is not operating properly when the voltage output is not within the desired voltage range.

10. An electronic switch system, comprising:
a resistive network for providing a voltage indicative of a pressure applied thereto;
a control circuit electrically coupled to the resistive network for receiving the voltage indicative of the applied pressure and providing an indication when the received voltage exceeds a predetermined value-indicative of an alarm condition;
a switch for selectively shunting an impedance into the resistive network to ground to bias the voltage indicative of the applied pressure to cause the control circuit to provide an indication of operability of the resistive bridge and the electronics control circuit without application of a pressure corresponding to a voltage exceeding the predetermined value; and
a monitoring circuit in electrical communication with the resistive network and the control circuit and adapted to provide a signal indicative of the operability of the resistive network and control circuit.

11. The system of claim 10, wherein the resistive network comprises a pressure sensitive piezoresistive Wheatstone Bridge.

12. A method, comprising:
testing operability of a resistive bridge and associated circuitry by selectively shunting an electrical impedance from ground into the resistive bridge, the impedance being of a magnitude to cause the resistive bridge output to be indicative of a presence of a sensed pressure condition without application of the sensed pressure condition to the resistive bridge;
receiving, by a monitoring circuit electrically coupled to a resistive bridge, an output of the resistive bridge;
comparing the output of the resistive bridge to a supply potential applied to the bridge;
providing, responsive to the testing and when the output of the resistive bridge is within a predetermined range of the supply potential, an indication that the resistive bridge and associated circuitry are operating properly.

13. The method of claim 12, wherein the predetermined range is 50±5% of the supply potential.

14. The method of claim 12, wherein the electrical impedance is of a magnitude to cause the output of the resistive bridge to be indicative of the sensed pressure condition of at least a sum of a threshold condition and atmospheric pressure.

15. The method of claim 12, wherein the monitoring circuit comprises a plurality of comparators adapted to determine whether the voltage output is within a desired voltage range.

16. The method of claim 15, wherein the monitoring circuit outputs a signal to indicate that the resistive bridge is not operating properly when the voltage output is not within the desired voltage range.

17. The method of claim 1, wherein providing the indication comprises outputting at least one analog output.

18. The method of claim 17, wherein the monitoring circuit comprises a plurality of comparators adapted to determine whether the analog output is within a desired voltage range.

19. The method of claim 18, wherein the monitoring circuit outputs a signal to indicate that an indicator is not operating properly when the voltage output is not within the desired voltage range.

* * * * *